2,995,322
PARACHUTIST'S EQUIPMENT
John J. M. Pragnell, Tilford, near Farnham, England, assignor to Irving Air Chute Co., Inc., Lexington, Ky., a corporation of New York
Filed Apr. 22, 1960, Ser. No. 24,022
Claims priority, application Great Britain Apr. 22, 1959
12 Claims. (Cl. 244—141)

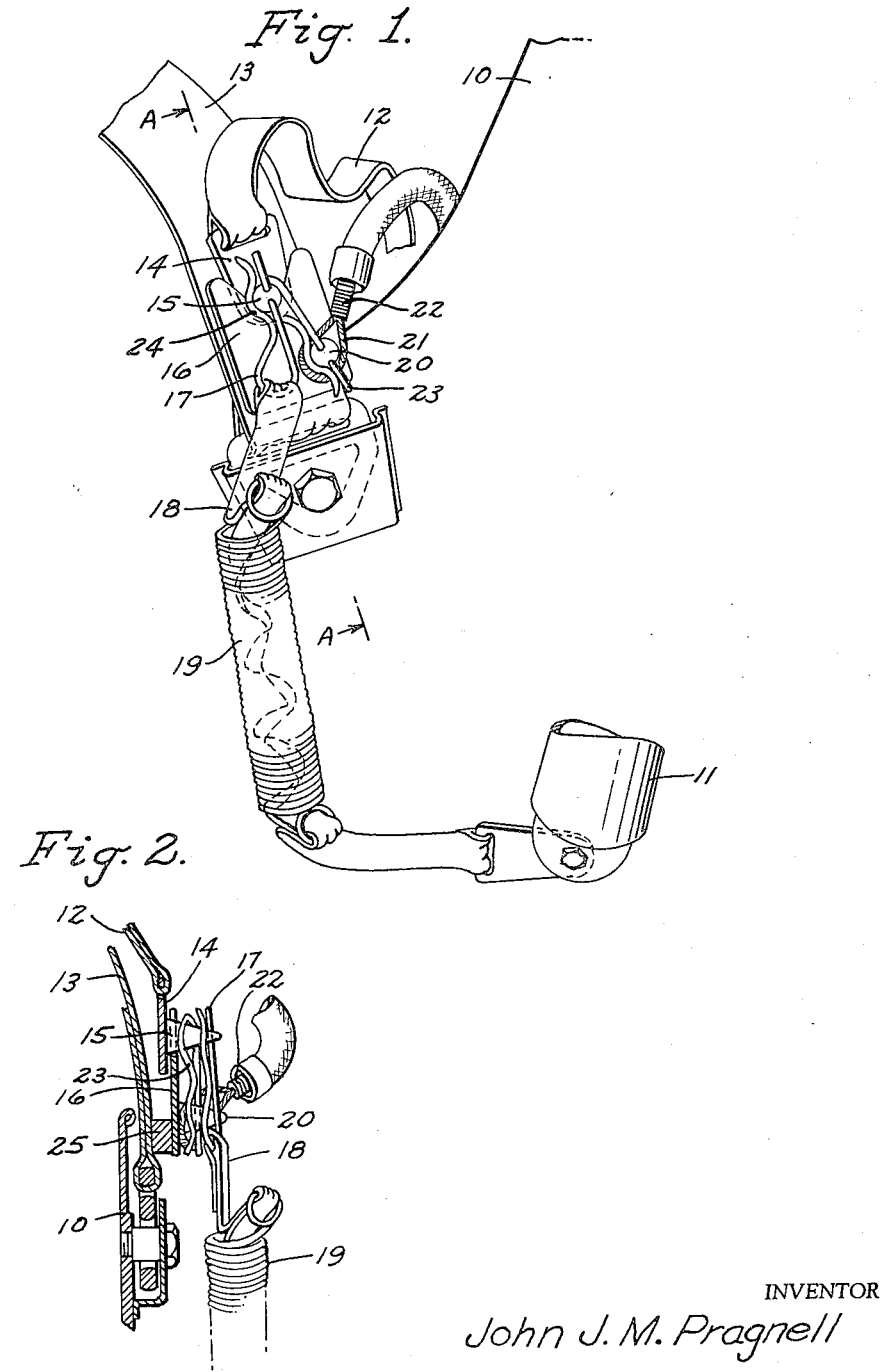

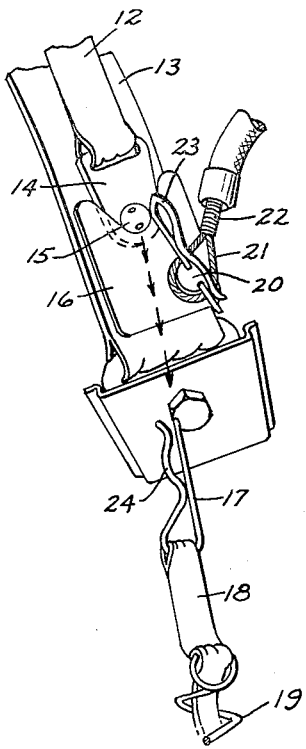
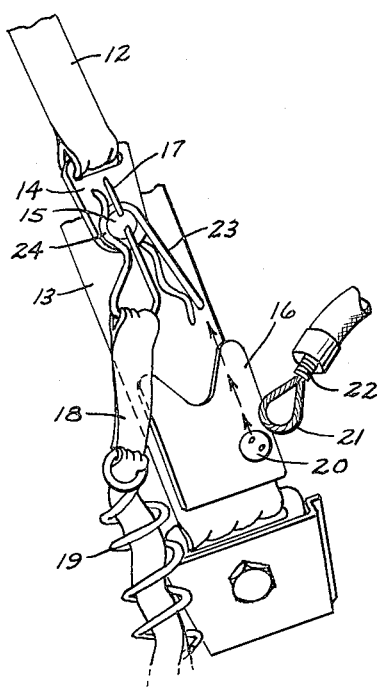
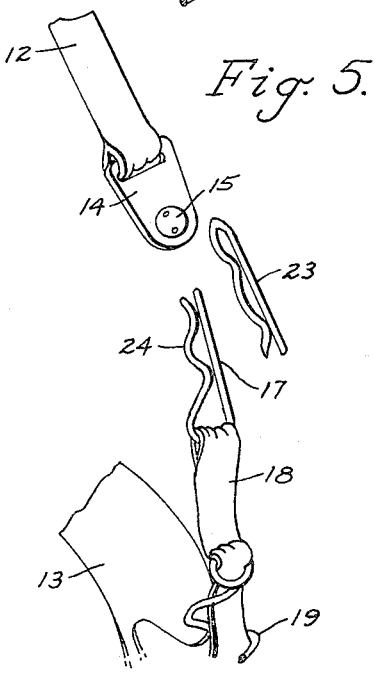

This invention is concerned with improvements in or relating to parachutist's equipment and in particular equipment for use in association with an ejector seat.

In a known kind of parachutist's ejector seat mechanism the sequence of operations when making a descent by parachute is to fire the ejector seat with the aviator secured therein by his seat harness and then to bring about release of the seat harness pursuant to a pull exerted by a drogue parachute, the drogue parachute sometimes being connected to the aircraft by a static line. When the parachutist separates from his seat a pull is exerted through a static line secured to the seat and extending to the arming mechanism of a barometrically controlled parachute release device incorporated in or on the parachute pack with the result that the parachute is released for deployment as soon as the parachutist reaches an atmosphere in which deployment can be safely initiated, i.e. the atmosphere for which the barometrically controlled device is set.

Alternatively, if an aviator wishes, or is obliged, to bail out manually, he must disconnect the static line leading to the arming unit of the barometrically controlled parachute release mechanism before unfastening his seat harness and moving from his seat otherwise the latter movement would arm the release mechanism and initiate the automatic release of the parachute from its pack. After once disconnecting the static line leading to the arming unit of the barometrically controlled release mechanism the parachutist must in any event operate the manual control, e.g. a rip ring, for releasing the parachute from its pack and this irrespective of whether he leaves the aircraft by bailing out through a door or he decides subsequently to bail out through use of the ejector seat.

The necessity in the said known equipment for a manually releasable connection for the static line to the arming unit of the barometrically controlled release mechanism imposes yet another manual operation on the various manual operations which have to be performed by a parachutist in what is almost certain to be an emergency and moreover this manual control presents a protuberance which in itself presents a hazard in the sense that it may become entangled with the aircraft or other parts of the parachutist's equipment.

One of the objects of the present invention is to provide equipment wherein the above mentioned difficulties inherent to known forms of equipment are avoided or greatly reduced.

According to the present invention there is provided parachutist's equipment including an ejector seat and a parachute pack associated with a barometrically controlled release unit which is adapted to be armed pursuant to the parachutist becoming separated from his seat by means of an arming cable extending from said seat to the said barometric unit, characterized in that means are provided for bringing about the automatic disconnection of the said arming cable from the seat pursuant to the user leaving the seat without making an ejection bail out while enabling the connection to be maintained for normal operation if the user makes an ejection bail out.

Equipment in accordance with the present invention may include any suitable safety harness for maintaining an aviator in his seat, such safety harness being manually releasable and also being automatically releasable in the event of the user making an ejection bail out. In the known equipment, it is of course necessary for the aviator to disconnect the aforesaid arming cable before releasing his safety harness preparatory to leaving his seat for instance for a manual bail out otherwise his movement from his seat will automatically initiate the parachute release operation. With the aid of equipment according to the present invention however an aviator only has to release his seat harness and move from his seat preparatory to making a manual bail out.

It is of course desirable that there should be provision for limited movements of the aviator in his seat without bringing about the disconnection of the barometric arming cable from his seat and this can be afforded for instance by incorporating an appropriate degree of slack in the union between the disconnect means and a part secured to the parachute harness.

The specific form of the means provided for disconnecting the aforesaid arming cable may vary within wide limits but it is at present preferred that they be of the cone and ring kind in conjunction with a withdrawal pin extending transversely through an opening in the cone for releasably retaining the ring on the said cone.

It is desirable to provide means whereby pursuant to making an ejection bail out the possibility of the disconnection of the arming cable from the seat is positively prevented otherwise the automatic arming of the barometric unit upon the parachutist becoming separated from his seat would be prevented. In accordance with a further feature of the present invention therefore the connection between the ejector seat and the arming cable is rendered immune to any movement of the parachutist with respect to his seat after such seat has been ejected from the aircraft. This can for example be achieved by a further releasable connection disposed between the arming cable disconnecting means and the floor of the aircraft, such further releasable connecting means being so designed that they become released pursuant to the aviator moving from his seat, e.g. for making a manual bail out, only after such movement has effected disconnection of the arming cable, the release pursuant to an ejection bail out being brought about automatically by the separation of the seat from the aircraft.

The aforesaid further releasable connecting means may also be of the cone and ring kind.

In order that the present invention may be well understood, one embodiment will now be described by way of example only and with reference to the accompanying diagrammatic drawings in which:

FIGURE 1 is a side view showing one form of disconnecting means in assembled relation, and parts of a parachutist's harness and ejector seat.

FIGURE 2 is a part cross sectional front view of the disconnecting means shown in FIGURE 1, taken substantially on the line A—A.

FIGURE 3 is a side view of the disconnecting means shown in FIGURE 1 but in the condition reached in an early stage of an ejection bail out.

FIGURE 4 is a side view of the disconnecting means shown in FIGURE 1 but in the condition reached when an aviator first moves from his seat preparatory to making a manual bail out.

FIGURE 5 shows the condition of the disconnecting means upon further movement of the avaiator from his seat.

Referring to the drawings and in particular FIGURE 1, there is shown a part of an ejector seat 10 associated with a known unit or bracket 11 mounted upon the frame or floor of the aircraft and forming a convenient anchor point for the static line 18. This figure also shows a strap portion 12 which is a part of a lanyard extending from the parachutist's harness and a strap portion 13 representing a part of the safety harness provided for securing an aviator in his seat, such safety harness being anchored to the seat 10 at its outer ends.

The free end of the lanyard 12 is provided with a stiff plate 14 from which there extends a tapered cone 15, such cone being normally seated in the notch of a notched plate 16.

The aforesaid cone 15 is provided with a transverse opening through which one leg of a generally U-shaped spring retaining pin 17 (cotter type) can releasably pass, such pin being inserted in the cone passageway in an upward direction as indicated and one leg being notched as shown at 24 so that it frictionally grips the said cone to prevent accidental release until the pin is sprung.

The ring-like head or bight portion of the pin 17 is secured to one end of a static line 18, the other end of such static line being anchored to the aircraft floor or bracket 11. This static line is of such a length that the pin 17 can be moved away from its anchorage through a short distance, e.g. a distance of say fifteen inches, and before the line becomes taut, the slack in said line normally being taken up by an extensible type helical spring 19. This spring is shown in its closed and slack-absorbing condition in FIGURES 1 and 2 and in extended conditions in FIGURES 3, 4 and 5.

Extending from the plate 16 which is fast with the aviator's seat 10 as shown at 25 is a cone 20 which is adapted to receive the looped end 21 of the arming cable 22 of the well known barometrically controlled parachute release unit such as shown in U.S. Patent 2,676,655, dated April 27, 1954, there being a spring retaining pin 23 (cotter type) for cooperation with the cone 20 in a manner similar to that in which the pin 17 cooperates with the cone 15 but being inserted downwardly instead of upwardly. The said pin 23 accordingly serves to lock the arming cable to the cone 20 and its ring-like head or bight portion being disposed over the first mentioned cone 15 in position behind the inserted retaining pin 17 when the parts are properly assembled.

In the assembled condition therefore, the arming cable 22 is anchored by the pin 23 and cone 20 to the ejector seat and the pin 23 in turn is anchored while in its cone inserted position by virtue of its disposal over the cone 15 and so maintained by virtue of its position behind the pin 17.

If, now, the parachutist wishes to carry out an ejection bail out, his chair is fired from the aircraft, thus tautening the static line 19 and as soon as such line becomes taut the upwardly extending pin 17 becomes withdrawn from the cone 15 and the ring-like head of the pin 23 is free to slide from that cone as indicated in FIGURE 3 of the drawings. In this condition the arming cable 22 is firmly anchored to the seat and when in the normal further functioning of the ejector seat the parachutist is freed from his seat, either by manual action or a delayed action gas initiator which is set in operation when the seat is ejected, and falls away therefrom a pull is generated in the cable 22 thus arming the barometrically controlled parachute-release mechanism.

If, on the other hand, the parachutist wishes to bail out manually, he merely has to release his seat safety harness 13 by operation of its conventional buckle mechanism and then rise from his seat. During this movement the lanyard 12 extends until it is taut and continued movement raises the stiff cone-carrying plate 14 thus lifting the cone 15 whereupon the pin 23 is withdrawn from the cone 20 thus disconnecting the arming cable 22. At this stage the pin 17 will still be in engagement with the cone 15 as indicated in FIGURE 4 of the drawings, but as soon as the static line 18 is fully extended the said pin 17 will be withdrawn from the cone 15 thus leaving the cone 15 entirely free on the end of the lanyard 12 as shown in FIGURE 5. At this stage the pin 23 is free to fall away; the pin 17 remaining in the aircraft and the parachutist being free for a manual bail out and for releasing his parachute manually e.g. by pulling on a rip ring (not shown).

If desired, the manually operable release means may over-ride the automatically operated release means so that the parachutist after making an ejection can operate his manual release if the barometrically controlled release device fails to operate or if for any reason he does not wish to rely on it.

If desired, the aforesaid retaining pins 17 and 23 may be safetied by break threads or by any other suitable means and it is advantageous that they should not be interchangeable thus avoiding any risk of the parts being incorrectly assembled. Thus for instance such pins may be of different diameters and the apertures in the receiving cones may be of correspondingly different diameters.

The aforesaid equipment not only simplifies the bail out procedure as compared with known equipment but results in a saving in the cost of the equipment and in the cost of servicing as the critical adjustment required in known forms of manually operable arming cable disconnecting means are unnecessary as also are the cables and housings required for efficient manually operable disconnecting means.

While one preferred embodiment of the present invention has been hereinbefore described, it is to be understood that there may be various changes without departing from the spirit of such invention or scope of the claims.

I claim:

1. In combination with an aircraft ejection seat having safety harness connected therewith for retention of an aviator in the seat, and a parachute barometric release arming member, a parachute harness connected lanyard, a static line connected with an aircraft at a portion thereof and remote therefrom having a safety means releasably attached to said lanyard, a member having a connection to the seat having safety means thereon releasably connecting the arming member of the barometric release thereto, said safety means last mentioned being held connected to the lanyard by the first mentioned safety means whereby as the static line is rendered taut and releases its safety means which is connected to the lanyard, said arming member safety means will be released from connection with said first mentioned safety means.

2. The combination described in claim 1 in which extensible means is connected to the static line at remote locations thereon for endwise collapsing the static line.

3. In combination with an ejection seat of an aircraft and releasable safety harness for holding the aviator in said seat and parachute associated barometric operated release means including an arming cable, safety means for releasable connection of the barometric release arming cable to the seat, a parachute harness attached lanyard, a static line having means connecting an end thereof to the aircraft and releasable safety means for connecting the opposite end of the static line to the lanyard, said safety means attaching the arming cable to the seat being releasably interconnected with the safety means connecting the static line to said lanyard whereby as an incident of a manual bail out of the aviator from the ejection seat the safety means holding the barometric release arming cable will be operated for freeing the arming cable from its seat connection, and thereafter the static line upon being rendered sufficiently taut will release the safety means connecting the static line to said lanyard.

4. The combination described in claim 3 in which extensible means is connected at its ends to the static line for holding the static line normally collapsed endwise.

5. In combination with an aviator's ejection seat mounted upon an aircraft and a safety harness for releasably connecting the aviator in said aircraft seat, a parachute harness attachable lanyard and a parachute barometric release arming cable, a static line connected to the aircraft and remote therefrom having a safety means releasably connected to said lanyard, safety means connecting the barometric release arming cable with the safety harness, said last mentioned safety means being releasably connected to said safety means first mentioned whereby the arming cable safety means will be released upon a manual bail out to free the arming cable from its connection with the safety means and for an ejection bail out the static line will release the safety means from connection with the lanyard and thereby maintain the second safety means in retained connection of the arming cable to the safety harness.

6. The combination as described in claim 5 in which an extensible helical spring is connected upon the static line at remote points for normally holding the static line lengthwise collapsed intermediate its ends.

7. In equipment for selective ejection or manual bail out operation of an aviator from an aircraft ejection seat, the combination of a parachute barometric release arming cable, a static line connected at one end to the aircraft upon which the ejection seat is mounted and having a safety retainer at its opposite end, an aviator's parachute harness operating lanyard releasably connected to the safety retainer of the static line, releasable safety means for connecting the arming cable of the barometric release upon the ejection seat, and means interconnecting the safety means last mentioned with the safety retainer whereby if a manual bail out is desired upon release of the safety harness the aviator upon arising will actuate the arming cable safety means for releasing the arming cable and thereafter the static line will release the safety retainer from connection with said lanyard.

8. Equipment as described in claim 7 in which if an ejection bail out is made the static line will release the safety retainer from the lanyard to free the lanyard and also free the arming cable safety means from connection with the safety retainer but with said safety means still in connection with the seat whereby as the aviator falls away from the seat the arming cable will actuate the barometric release.

9. Equipment as described in claim 7 in which an extension spiral spring is connected at its ends to the static line for normally collapsing a long length of the static line lengthwise whereby it will be held collapsed in an out-of-the-way position so that a short length movement of the cable is initially only necessary during an ejection bail out to free the safety retainer from its connection with said lanyard.

10. Equipment as described in claim 8 in which extensible means for normally holding the major length of the static line collapsed and in an out-of-the-way position is provided connected at its ends to remote ends of the static line so as to permit the static line to extend its full taut length during a bail out operation.

11. In combination with an aircraft attached static line and an aviator's harness having a lanyard connected thereto and a parachute barometric release with an arming cable connected therewith, a static line connected at one end to the aircraft, a transversely apertured cone connected to said lanyard, a cotter type spring safety pin connected to the static line remote from the static line connection with the aircraft disposed in releasable connection in the aperture of said cone whereby to hold the static line connected to said cone, an aircraft seat connected cone which is also transversely apertured, a cotter type spring pin releasably connected in the aperture of the last mentioned cone and releasably holding the arming cable connected to the aircraft seat attached cone, the last mentioned pin having a ring shaped head receiving the first mentioned cone therein and retained upon said first mentioned cone by the safety pin which is connected to said static line whereby during a manual bail out the arming cable safety pin will be first released from its connected cone and thereafter the static line connected safety pin released from the cone of the lanyard, and whereby during an ejection bail out the first mentioned safety pin will be released from the lanyard cone and permit the second mentioned safety pin to slip over the first mentioned cone with its safety connection with the second cone intact for holding the barometric release arming cable in operating connection to said aircraft seat.

12. The combination described in claim 11 in which the safety pin first mentioned as connected to the lanyard is released by a downward pull and in which the safety pin connecting the arming cable to the aircraft is released by an opposite upward pull.

References Cited in the file of this patent

UNITED STATES PATENTS

| | | |
|---|---|---|
| 355,916 | Black | Jan. 11, 1887 |
| 478,712 | Pew et al. | July 12, 1892 |
| 2,708,083 | Martin | May 10, 1955 |
| 2,711,870 | Martin | June 28, 1955 |
| 2,940,704 | Le Van | June 14, 1960 |
| 2,950,885 | Hatfield | Aug. 30, 1960 |